United States Patent [19]

Cowart, Sr.

[11] 4,418,589

[45] Dec. 6, 1983

[54] METHOD AND APPARATUS FOR AUTOMATICALLY FACING SAW BLADES HAVING VARYING CONFIGURATIONS OF TEETH

[76] Inventor: Ronald G. Cowart, Sr., Rte. 2, Box 28, Hahira, Ga. 31632

[21] Appl. No.: 238,366

[22] Filed: Feb. 26, 1981

[51] Int. Cl.³ ............................................. B23D 63/12
[52] U.S. Cl. ........................................ 76/112; 76/41; 76/77
[58] Field of Search ........................ 76/37, 41, 43, 112, 76/75, 76, 77

[56] References Cited

U.S. PATENT DOCUMENTS

| | | | |
|---|---|---|---|
| 907,862 | 12/1908 | Nicholls | 76/41 |
| 2,855,809 | 10/1958 | Kaiser | 76/77 |
| 3,341,983 | 9/1967 | Baldenhofer et al. | 5/267 |
| 3,691,874 | 9/1972 | Miller | 76/41 |
| 3,766,806 | 10/1973 | Benner | 76/37 |
| 4,018,107 | 4/1977 | Stier | 76/41 |
| 4,111,075 | 9/1978 | Varley | 76/41 |
| 4,357,841 | 11/1982 | Mote | 76/77 |

Primary Examiner—James L. Jones, Jr.

Attorney, Agent, or Firm—Sherman & Shalloway

[57] ABSTRACT

A method and apparatus for automatically facing saws is described in which a saw blade is held over a spindle by a pair of electromagnets. A pawl engages successive gullets between saw blade teeth in order to index the saw blade. A grinding head mounted on a carrier then moves into engagement with the indexed saw blade until the carrier reaches a limit. Separate hydraulic actuators are used for the pawl and the grinding head carrier so that a sequence of operation can be maintained. The apparatus is adjustable and a counter is provided to automate the sequencing operation. By indexing the saw blade with the pawl, using the electromagnets to hold the saw blade and automatically sequencing the operation, saw blades with irregular tooth patterns and strobe saws having deep-cut rakers extending toward the center of the blade can be automatically faced. A sequence programmer, responsive to a plurality of sensors, controls sequencing of operations of the pawl and grinding head. The sensors provide indications to the programmer of positions or hydraulic pressures associated with the pawl and grinding head.

25 Claims, 6 Drawing Figures

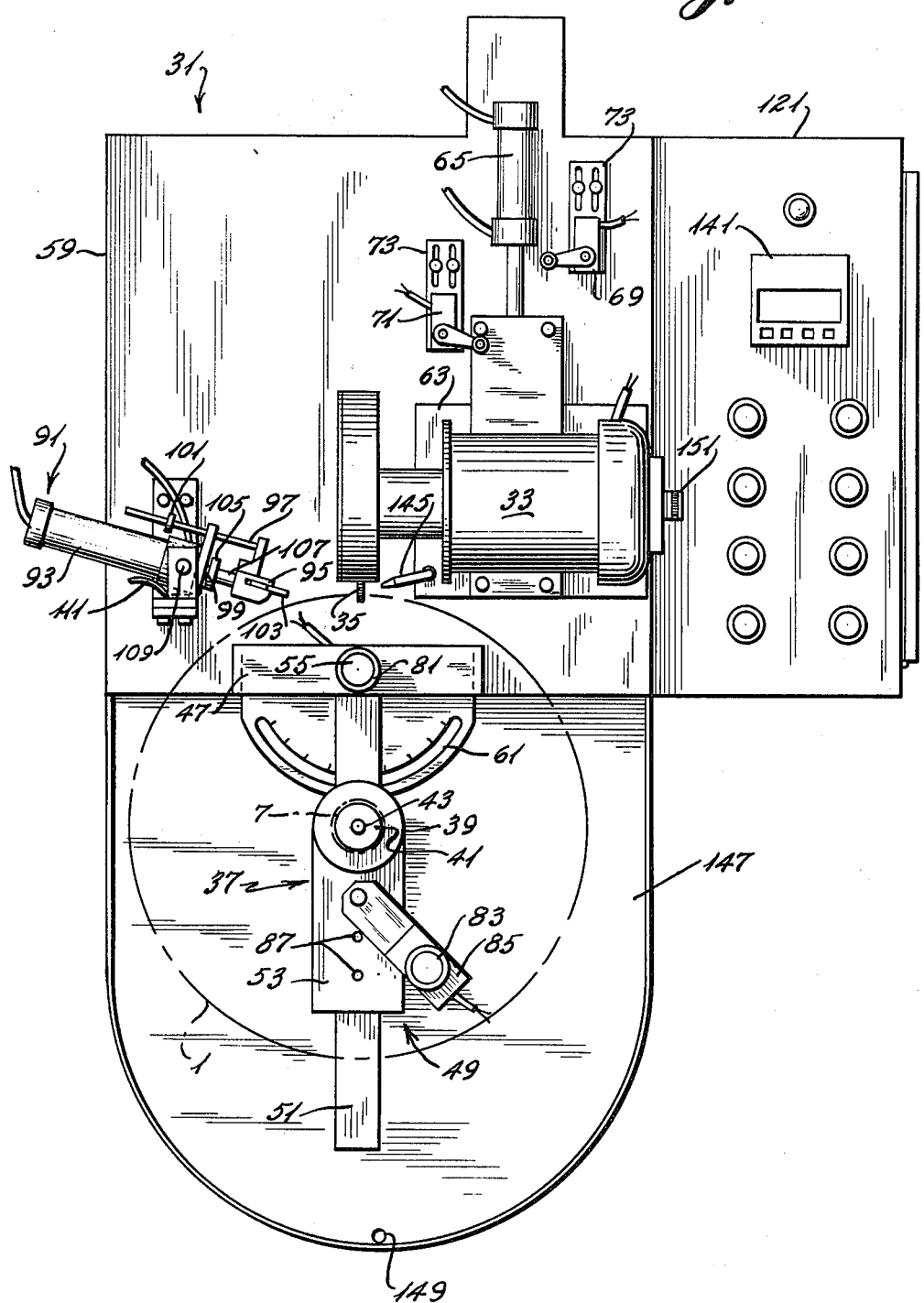

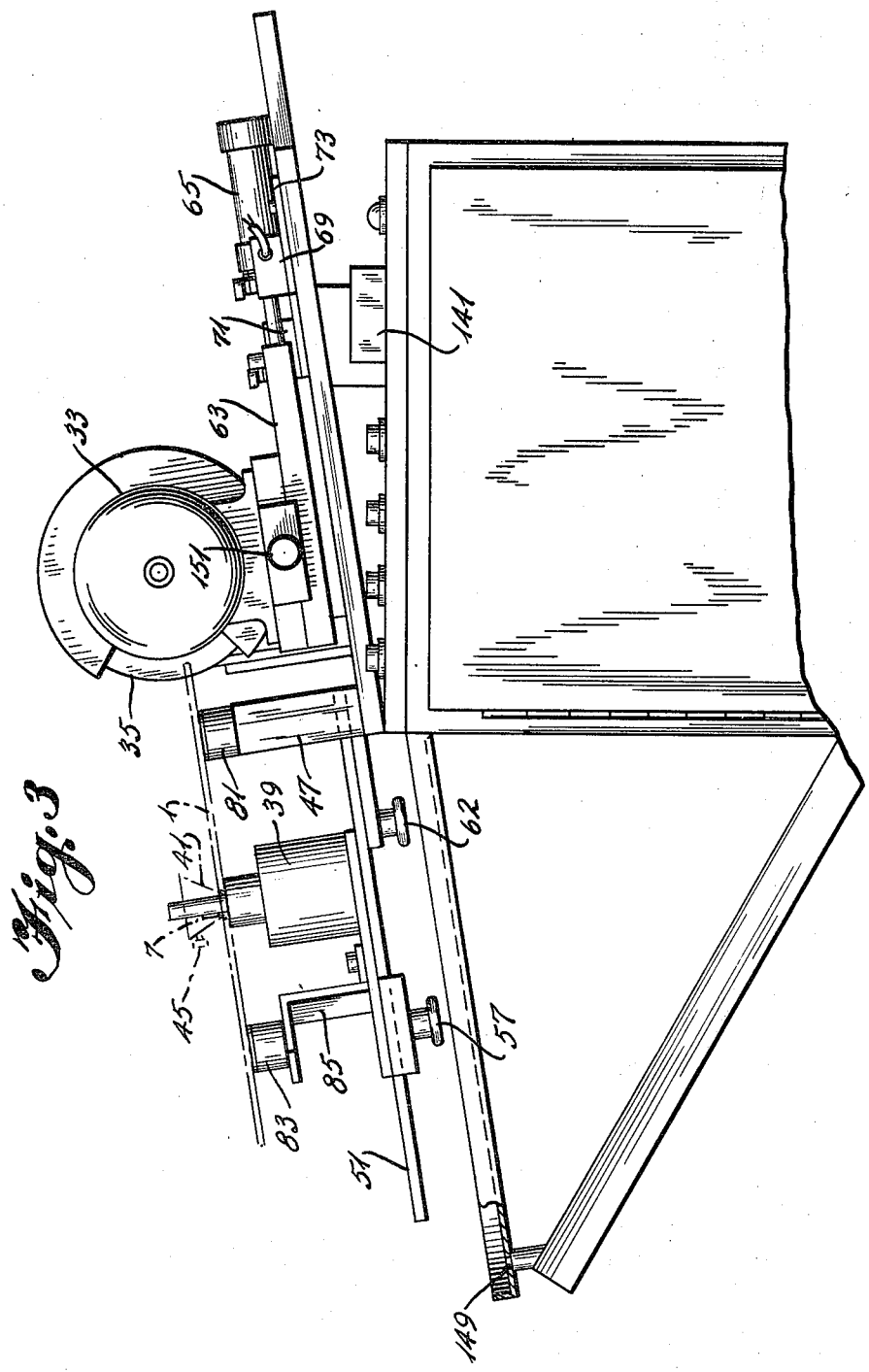

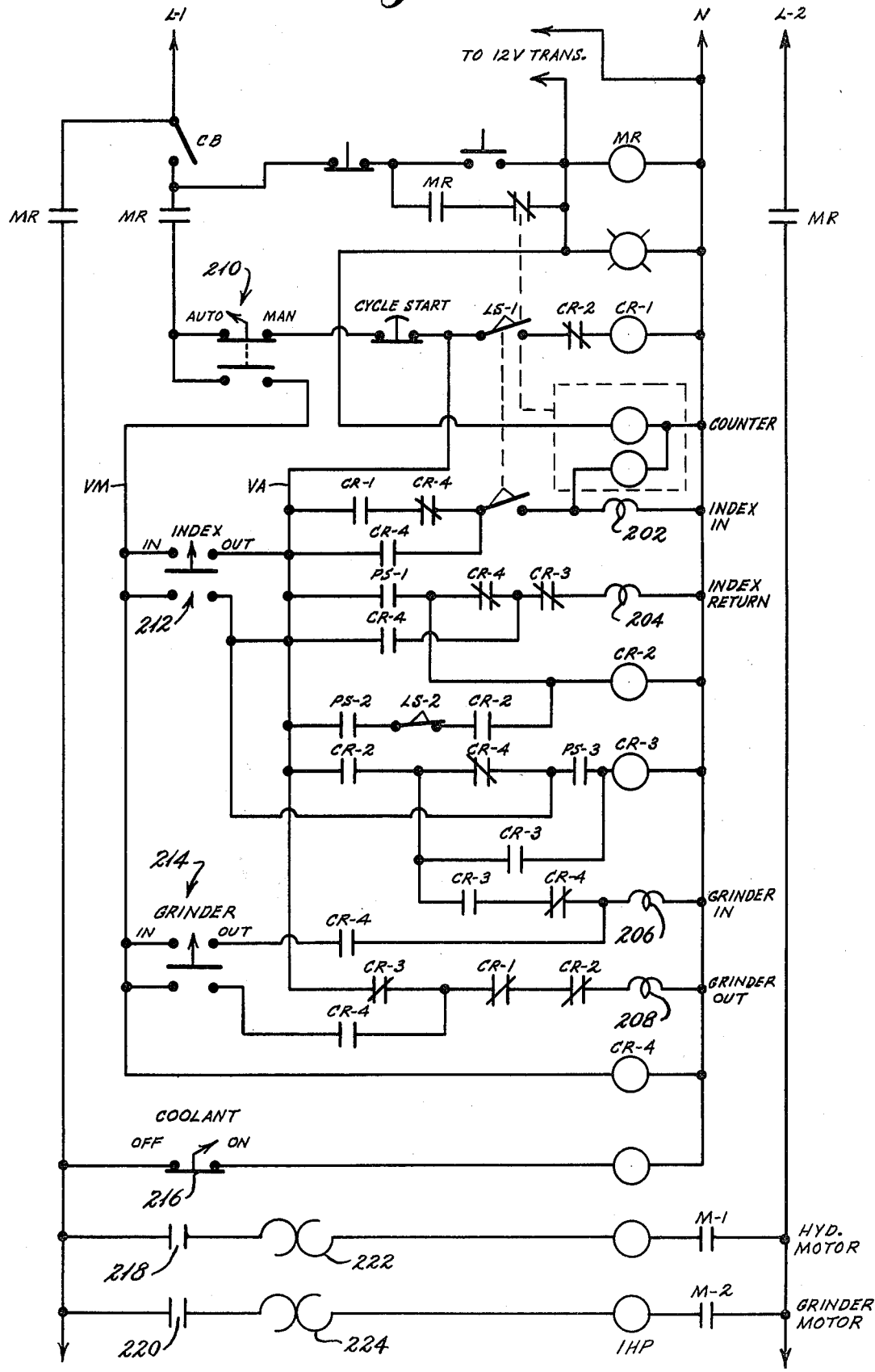

METHOD AND APPARATUS FOR AUTOMATICALLY FACING SAW BLADES HAVING VARYING CONFIGURATIONS OF TEETH

BACKGROUND OF THE INVENTION

1. Field of Invention

This invention is directed to the "facing" or sharpening of rotary saw blades of the type having a plurality of teeth cut into the outer perimeter of a disc. This type of saw blade operates by rotating about a disc axis while the disc axis is moving relative to the material being cut. This relative movement may be effected with either the axis stationary or the material being cut stationary.

In many cases, the teeth are provided with a hard coating of a carbide material, resulting in a carbide tip used as the cutting portion of each saw tooth. The saw teeth may be uniform throughout the circumference or they may be of different sizes and spaced irregularly about the circumference. The cut-out spaces between the successive teeth are called "gullets."

In a type of saw blade called a "strobe saw blade," deep "rakers" extend from some of the gullets radially toward the center of the saw blade disc. Typically, two such rakers are provided and a carbide edge extends slightly from the planar surface of the disc at the raker. These rakers enable the saw blade to cut through materials which are likely to expand against the saw blade disc as the saw blade disc is progressing in its cutting operation. The rakers are used to shave this expanded material, thereby preventing the expansion from "jamming" the saw blade by rubbing against it. Such strobe saw blades are used, e.g. in the lumber industry for trimming uncured wood.

The deep rakers of strobe saw blades, by their very nature, cause difficulties in an automatic saw facing apparatus. This is because the automatic saw facing apparatus must grip the saw blade during the facing operation in order to prevent the saw blade from rotating during grinding steps and in order to hold the saw blade on the apparatus. Because the most advantageous location for gripping the saw blade is between the center axis and the teeth around the perimeter of the saw blade, these rakers, and particularly the carbide edges of the rakers will usually get in the way of the gripping means. While the carbide edges of the rakers can be hollow ground in order to make them essentially self-sharpening, it is necessary to face the successive teeth about the perimeter of the saw blade, despite the presence of the carbide edges of the rakers.

The type of applications in which strobe saws are employed, as well as the presence of the "rakers" results in a significant percentage of strobe saws having irregularly spaced teeth about their perimeters.

Since such strobe saws tend to have irregularly spaced teeth, automatic facing of the saw blades must be accomplished in such a way as to compensate for the varying spacing of the teeth.

2. Description of the Prior Art

Automatic machines to perform cutting operations on saw teeth are well known in the prior art. For example, U.S. Pat. No. 907,862 shows a machine in which a finger reciprocally driven by a wheel causes successive teeth to be moved forward. At the same time, an emery wheel is moved into engagement with the teeth in order to slant an outer perimeter of the teeth. However, the fixed relationship of the eccentric mounting of the finger and the emery wheel require that the apparatus be carefully indexed according to a given spacing of saw teeth on the saw blade. Such indexing requires skilled operation and would make the automatic facing of blades having irregularly spaced teeth difficult, if not impossible.

U.S. Pat. No. 4,111,075, shows a grinding machine in which an indexing finger turns a saw blade to a fixed location. The saw blade is then clamped between a pair of pads which are forced together by a clamping cylinder. It is necessary that those clamping pads be lightly biased during the indexing operation in order that only the desired rotation, i.e., that rotation caused by the indexing, take place. Such an arrangement does not provide for the indexing of saws having irregularly spaced teeth. More importantly, by the use of opposed clamping pads, a strobe would interfere with the operation of such a device and therefore a strobe saw could not be automatically faced. If a strobe raker is in engagement with the clamping pads, the saw blade would be permitted to pivot on the raker, thus causing excessive vibration.

U.S. Pat. No. 4,018,107 shows the use of a feed pawl operating on each successive tooth face. However, reciprocal operation of the feed pawl is effected by rotating cams, therefore making adjustment difficult. No means for clamping the saw blade between the center spindle and the teeth, while permitting the passage of a strobe saw raker, is disclosed, as a rotational position of the saw is maintained by the engagement of the grinding disc with the gullets between a tooth back and a precutting tooth.

The use of magnets to hold a cutting blade is shown in U.S. Pat. No. 3,766,806. However, these magnets are used to hold the blade down on the table. By using permanent magnets and by the use of an indexing detent which engages a blade remotely from the index position, the magnets are not used to cooperate with the indexing means to permit automatic facing of strobe saws. Furthermore, the automatic facing of irregularly spaced teeth is prevented by the indexing detent being remote from the index position.

Accordingly, it is an object of the present invention to provide means for automatically facing blades including carbide tipped strobe saw blades and saw blades having irregularly spaced teeth.

A further object of this invention is to provide means for facing saw teeth on a saw blade while gripping a portion of the blade between the saw teeth and the center spindle even where that portion may have surface interruptions or irregularities.

A further object of the invention is to provide readily adjustable means for indexing a wide variety of saw blades where the indexing means engages that saw blade tooth to be indexed, thereby placing that tooth in a position to be faced, irrespective of the regularity of tooth spacing. It is a further object of the invention to provide such saw tooth facing apparatus wherein the indexing means cooperates with a pair of electromagnetic gripping means in order to permit vibration to be reduced and to permit the facing of saw blades having irregular tooth spacing and/or irregularities on the surface between the saw teeth and the center spindle hole of the saw tooth.

It is a further object of this invention to provide automatic saw facing apparatus which is simple in construction and does not require complicated adjustments.

It is a further object of the invention to provide saw facing apparatus which uses hydraulic actuation and pressure switches to operate an automatic sequencing means. It is a further object of the invention to provide such simplified cutting apparatus which has a counting means to automatically face a predetermined number of saw teeth or to reface the saw teeth a predetermined number of times.

It is yet a further object of the invention to provide automatic saw facing apparatus which has an indexing means which reciprocates into a position which permits it to engage a successive tooth or to skip teeth during its automatic operation.

It is a further object to provide such apparatus which, by adjusting the stroke of retraction of an indexing means, the indexing means is able to index successive irregularly spaced teeth. It is yet a further object of the invention to provide automatic saw facing machine which is economical in operation. It is still a further object of the invention to provide automatic saw facing machine which has enhanced operation by indexing saw teeth with an indexing means which moves to an index position, permitting a saw tooth cutting wheel to engage the saw tooth at the index position and which provides a lubrication means to prolong the life of the saw tooth cutting wheel.

It is yet another object of the invention to provide a sequence programmer for causing a facing apparatus to execute the required sequence of steps for facing carbide tipped strobe saw blades.

Yet another object of the invention is the provision of a sequence programmer utilizing relays, responsive to position and pressure conditions, for controlling an indexing and a grinder advancing and retracting hydraulic operation.

SUMMARY OF THE INVENTION

These and other objects are provided by an automatic saw-facing machine having a center spindle, an electromagnetic gripping means, a reciprocally movable saw-blade cutting means, a saw-blade indexing means and an automatic sequencing means. The indexing means includes a pawl and pawl actuator and has an adjustment for controlling the distance that the pawl travels, thus defining the index position. The automatic sequencing means sequences the operation of the machine and permits the machine to operate for a preselected number of cycles, thus providing automatic operation.

In a further aspect of the invention, the center spindle element comprises a cone-shaped member which slides over a center shaft to position the saw blade on the apparatus.

In a further aspect of the invention, the operation of the electromagnetic gripping elements and the cone-shaped center spindle permit the facing of saw blades having profile irregularities such as deep-cut rakers found on strobe saws.

In another aspect of the invention, the pawl actuator is extended and retracted by the hydraulic pressure. Stops may be installed on the hydraulic actuator to increase the pressure when the stops are reached, thus indicating the completion of an index extension or retraction step.

In a further aspect of the invention, a method is provided for grinding saw blades wherein a saw blade is placed on a center spindle, the saw blade is indexed by extending an indexing means against a saw tooth to an index position, the saw blade is gripped by electromagnetic force, a grinding wheel is reciprocated toward the index position after the index means has been retracted, and the grinding wheel is then retracted away from the index position. These steps are repeated a predetermined number of times, thus permitting the automatic facing of a saw blade having a plurality of cutting edges.

In yet a further aspect of the invention, an automatic saw facing machine is provided wherein a saw blade may be mounted on a cone-shaped element on a center spindle to position the blade, an electromagnetic gripping means grips the blade, a grinding wheel is reciprocated into and out of engagement with the saw blade by an hydraulic cylinder, an hydraulically actuated pawl extends to index the saw blade after the grinding wheel has been reciprocated out of grinding engagement, and the operation is sequenced a predetermined number of cycles so as to automate the operation.

In yet a further embodiment, lubrication is provided to lubricate the grinding wheel as it engages the saw blade, thus facilitating the automatic operation and reducing wear on the grinding wheel.

BRIEF DESCRIPTION OF THE DRAWINGS

FIG. 2 is a top view of an apparatus for facing saw blades according to the invention.

FIG. 3 is a side view of the apparatus of FIG. 2.

FIG. 5 is a wiring diagram for one embodiment of a programmer for the inventive apparatus.

DETAILED DESCRIPTION OF THE PREFERRED EMBODIMENT

Figure 1:
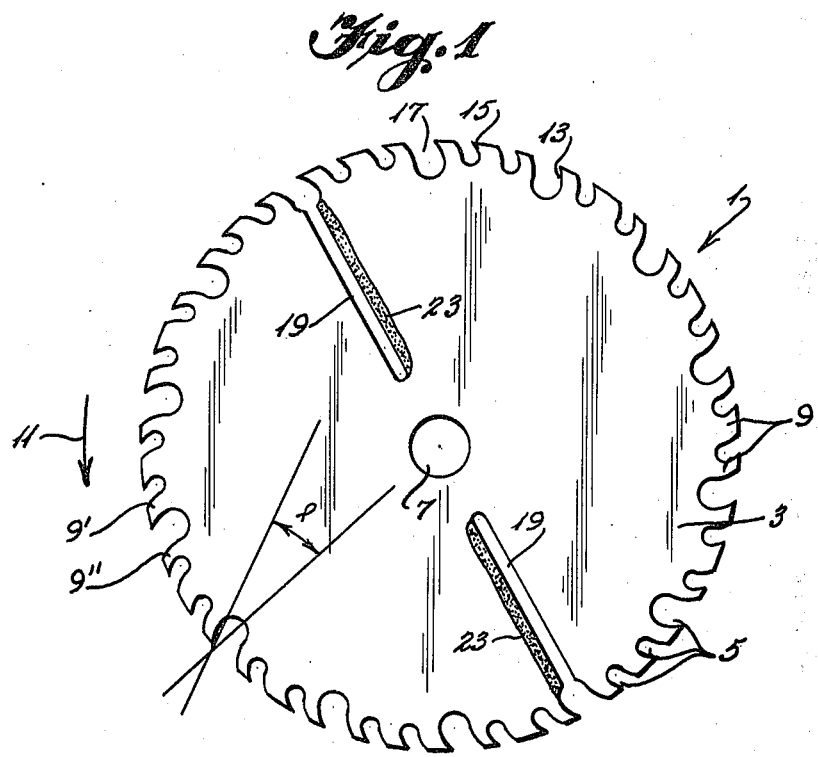
FIG. 1 shows a typical saw blade of the type faced by the invention.

Referring to FIG. 1, most circular saw blades 1 are made in the form of a sheet metal disc 3 having a plurality of cuts 5 cut around the perimeter thereof. A center hole 7 is also cut for the purpose of moutning the saw blade 1 on a center hub of an electric saw (not shown). The plurality of cuts 5 give the saw blade 1 its cutting ability by leaving a plurality of saw teeth 9 between the cuts 5. Normally, the saw blade is intended to rotate in a specific direction, indicated by arrow 11. This direction of rotation is used to define a forward direction of the saw blade 1 as well as a forward portion 13 of each tooth 9. It can readily be seen that the forward portions 13 are cutting edges of the circular saw and therefore are the most susceptible to wear. The cuts 5 are referred to as gullets.

Because of the wide variety of materials to be cut, as well as the different sizes of saw blades and different saw apparatus, various arrangements are provided for the spacing of saw teeth. For example, in the embodiment shown, small gullets 15 are interspaced with large gullets 17. This arrangement is used in the lumbering industry where large gullets provide the most efficient cross-cutting of lumber while a large number of teeth provide even-cutting parallel to the wood grain. This embodiment is called a "strobe saw" because deep rakers 19 extend from some of the gullets 5 toward the center hole 7. These "deep rakers" are particularly useful where the material cut has a tendency to expand after the initial cut. Such circumstances are often found in the cutting of green lumber. It should be noted that often the cutting edges 13 are not entirely flush with the surface of the sheet metal disc 3. However, because of the direction 11 of travel, the cutting edges 13 of the teeth are made normal to planar surface of the disc 3. Like the gullets 5, the deep rakers terminate in a cutting edge 23. This cutting edge 23 like the cutting edges of the teeth 13 may extend from the plane of the sheet metal disc 3. The cutting edges 13, 23, are usually formed with a hard coating such as tungsten carbide. A purpose of the deep rakers 23 is to enable the saw blade 1 to cut through material which tends to expand when cut, such as green lumber. The deep rakers 19 enable the saw blade 1 to trim the expanded material. Therefore, the deep rakers function primarily as an anti-jamming device and do not require a great deal of maintenance. However, their mere presence requires that any processing of the cutting edges 13 of the teeth 9 take into consideration the presence of the deep rakers 19 and, particularly, the cutting edges 23 thereof, which create the aberrations in the otherwise planar surface of that portion of the sheet metal disc 3.

Referring to FIGS. 2 and 3, an automatic cutting apparatus 31 according to the invention comprises a motor 33 to which is attached grinding wheel 35. The grinding wheel 35 is usually in the form of a disc made of composite material, including diamond chips. The diamond chips are able to cut the carbide on the cutting edges 13 of the teeth while being wear resistant. Saw blade 1 (shown in phantom) is placed on top of blade mounting apparatus 37 so that center hole 7 is positioned over hub ring 39 located on blade mounting apparatus 37 and blade 1 is centered and clamped to hub ring 39 by positioning cone 41. Hub ring 39 includes a hollow portion at its center for receiving the lower conical portion of the diameter narrower than and protruding through the central hole 7. The hub ring may include a smaller diameter cylindrical portion mounted on a larger diameter cylindrical base as seen in FIG. 3. The positioning cone 41 is slidably mounted on a center shaft which is fixed to blade mounting apparatus 37 and is at the center of hub ring 39. The positioning cone 41 is mounted so that its largest circumference (normal to its center axis) is at the top. Therefore, the positioning cone is pressed downward against the saw blade 1 at its center hole 7. A set screw 45 retains the positioning cone 41 at its desired positioning on center shaft 43.

Blade mounting apparatus 37 includes arm carrier portion 47 and arm portion 49. The arm portion 49 comprises an arm 51 onto which is clamped a slider 53. The arm 51 is formed from 1.5 cm×5 cm bar stock and pivots from a stripper bolt (not shown) at one end of the arm portion about a swing axis 55 located on the arm carrier portion 47. The slider 53 is slidably mounted on arm 51 an then is clamped to a fixed position on arm 51 with clamping screw 57. The hub ring 39 is fixed to slider 53.

The arm carrier portion 47 is fixedly mounted to a chassis 59 of the automatic cutting apparatus. An adjustment arc opening 61 is cut into the arm carrier portion 47 and clamp screw 62 is used to clamp the arm 51 onto the arm carrier portion 47 at the adjustment arc opening 61 in a conventional manner. Thus, the arm portion 49 is able to swing about swing axis 55 until it is clamped by clamp screw 62 at the adjustment arc opening 61.

The motor 33 supporting the grinding wheel 35 is mounted to carrier 63. Carrier 63 is slidably mounted on chassis 59 so as to move grinding wheel 35 into and out of engagement with a saw blade mounted on the blade mounting apparatus 37. This movement is perpendicular to a center axis of the grinding wheel 35. The carrier 63 is controlled in its movement by a main actuating cylinder 65 which is fixed to chassis 59. The main actuating cylinder 65 is located on the opposite side of carrier 63 from the blade mounting apparatus 37 so that when the main actuating cylinder 65 is fully extended, the slider 53 with the blade 1 clamped to its hub ring 39 may be moved toward the grinding wheel 35 until the grinding wheel 35 intersects a gullet 5. Clamp screw 57 on the slider 53 can be tightened, thereby fixing the distance of the center hole 7 of the saw blade 1 from grinding wheel 35. By pivoting the arm 51 about the swing axis 55, the angle that the grinding wheel 35 enters the gullet 5 can be adjusted. The angle can be fixed by tightening the arm 51 at the adjustment arc opening 61 with clamp screw 62. This angle should correspond to a "rake angle" $\rho$ of cutting edges 13. The rake angle $\rho$ is the angle that the cutting edge 13 makes as it intercepts a radius of saw blade 1 at the perimeter of the saw blade. This is the angle at which the cutting edges 13 are ground.

Because swing axis 55 is designed to clear the grinding wheel 35, the adjustment of arm portion 49 along adjustment arc openings 61 affects the maximum insertion distance of grinding wheel 35 into the gullets 5 of the saw blade 1. Therefore, the adjustment of the maximum extension of the main actuating cylinder 65 is provided.

The main actuating cylinder 65 is controlled in its minimum and maximum extension by minimum and maximum limit switches 69 and 71. The maximum limit switch 71 is made adjustable by a fine adjustment means 73 which controls the amount of travel of the carrier 63 necessary to activate the maximum limit switch 71. A similar fine adjustment means 73' controls placement of minimum limit switch 69.

The fine adjustment means 73 is used to control the distance that the grinding wheel 35 enters into gullet 5 to a desired precision.

In order to hold saw blade 1 so as to prevent it from rotating about the hub ring 39 during grinding operations, a primary electromagnet 81 and a secondary electromagnet 83 are located on the blade mounting apparatus 37. Both electromagnets 81 and 83 terminate in the plane of the top horozontal plane of hub ring 39 and are designed to apply their magnetic force to a ferromagnetic object (such as a saw blade) in that plane.

Primary electromagnet 81 is fixed to the arm carrier portion 47 at the swing axis 55. Therefore, the primary electromagnet is able to hold saw blade 1 at a location very close to grinding wheel 35 when the main actuating cylinder 65 is extended.

Secondary electromagnet 83 is fixed to a magnet carrying arm 85 which is, in turn, mounted to slider 53 at one of three holes 87. The magnet carrying arm 85 is positioned in one of the holes 87 so that the secondary electromagnet 83 will engage the circular saw blade 1 preferably clearing the gullets 5. The secondary electromagnet 83 is positioned away from a line extending from the primary electromagnet 81 and hub ring 39. This angular positioning of the secondary electromagnet 83 tends to stabilize saw blade 1 and thereby retards vibration which would result from a grinding operation.

In order to have grinding wheel 35 extend into a gullet 5 to engage a cutting edge 13, it is necessary to index saw blade 1 on the apparatus 31. This is accomplished by an indexer 91. Indexer 91 comprises an index actuating cylinder 93 which extends and retracts pawl 95. An index extension rod 97, fixed to the pawl 95 in a position parallel to the extension direction of index actuating cylinder 93, slides in and out of a flange 99 which is fixed to the index actuating cylinder 93. An index position stop 101 may be adjustably clamped onto index extension rod 97 so as to abut against flange 99 when index actuating cylinder 93 is extended to a desired position. This desired position is set as the index position. Preferably, a positive stop with micrometer adjustment (not shown) is provided at the bottom of cylinder 93. Pawl 95 has mounted thereto a pawl finger 103 which is part of pawl 95 and is engageable against a saw tooth 9 at a cutting edge 13. The index position may therefore be set by index position stop 101 so that pawl finger 103 extends the cutting edge 13 of saw blade 1 into alignment with grinding wheel 35. Thus, the index position is a function of the physical location of index actuating cylinder 93, the maximum extension of pawl 95 as may be set by stop 101, and as will be seen, the radius of a saw blade and the position of hub ring 39. In the preferred embodiment, however, the index position is set by positioning of cylinder 93 and is achieved when the cylinder is fully extended, or bottomed out. Thus, when main actuating cylinder 65 extends, carrier 63 moves motor 33 and grinding wheel 35 into engagement with the cutting edge 13 of saw blade 1.

An index retract stop 105 is clamped to the indexer 91 at either the index extension rod 97 or the index actuating cylinder's cylinder rod 107, as shown. Index retract stop 105 is clamped so as to abut against the flange 99 when an index retract position has been reached. This sets the maximum retraction of the pawl 95 by the indexer 91.

The indexer 91 pivots about an index pivot axis 109 and is biased to pivot toward positioning cone 41 by a spring 111. Thus, pawl finger 103 of pawl 95 is caused to engage saw blade 1 at its perimeter. By reciprocating movement of index actuating cylinder 93, the pawl finger 103 engages successive cutting edges 13 on saw blade 1 in a manner which will be described.

Referring to FIG. 1, as one views successive adjacent saw teeth 9 in the direction of the arrow 11, each successive saw tooth 9 is in a position "forward" of the previous saw tooth 9. Thus, for example, saw tooth 9" would be immediately forward of saw tooth 9'. By the reciprocal movement of pawl 95, pawl finger 103 is caused to first engage a cutting edge 13 as the index actuating cylinder 93 extends. As the index actuating cylinder 93 retracts, the pawl finger 103 slides over a saw tooth 9, thus, placing the pawl finger 103 in a position to engage a subsequent cutting edge located forward of the cutting edge previously engaged. By extending index actuating cylinder 93, the pawl finger is able to index the subsequent cutting edge 13. However, even while pawl finger 103 is engaging a cutting edge 13, it is biased against tooth 9 immediately forward of that cutting edge 13 which the pawl finger 103 is at the moment engaging. This bias is accomplished by spring 111. By sliding over the saw teeth 9, the pawl 95 is able to substantially ignore the depth of the gullets 5.

By adjusting the index retract stop 105 to increase the retraction of finger 103, the indexer 91 can be made to skip a few cutting edges 13 with each stroke. This has a particular advantage if, for example, it is desired to adjust the maximum limit switch 71 for the main actuating cylinder 65 (by the fine adjustment means 73) so as to cut deeper into the large gullets 17 of saw blade 1, such as shown in FIG. 1. In that example, indexer 91 would be made to skip two successive cutting edges 13 associated with small gullets 15 and engage every third cutting edge 13 associated with large gullets 17.

In most saw blades, including saw blades having uneven tooth spacing, such as illustrated in FIG. 1, it is possible for indexer 91 to index each of the successive cutting edges 13 using a single adjustment of stop 105, despite the variations in the spacing of the cutting edges 13.

In cases where a strobe saw is to be faced, saw blade 1 is placed so that its center hole 7 is over the center shaft 43 of the apparatus 31. Positioning cone 41 is then placed over saw blade 1 on centering shaft 43 and clamped into position with set screw 45. The saw blade 1 is now held between positioning cone 41 at center hole 7 and hub ring 39 near the center hole. Hub ring 39 is provided with a circumference which is in most cases less than the inward reach of deep rakers 19; but even where deep rakers 19 and their respective cutting edges 23 engage hub ring 39, the hub ring and positioning cone remain functional because the cutting edges 23 for deep rakers are permitted to glide along the hub ring. Positioning force is exerted by electromagnets 81 and 83.

These electromagnets 81, 83 are provided with carbide inserts on one of their surfaces so that any aberrations in the surface of the saw blade 1, such as cutting edges 23 are able to glide over the electromagnets 81, 83 without destroying the electromagnets 81, 83. Because the electromagnets use the electromagnetic attraction which they exert against the saw blade as a clamping force, the aberrations are able to pass over the electromagnets 81, 83. Thus, the clamping means which use the electromagnets 81, 83 are able to provide a clamping force to strobe saw blades while permitting the blade to be rotated during indexing.

In order to provide for automatic operation of apparatus 31, it is necessary to provide a sequencing means to sequence the indexing by indexer 91 and the extension and retraction of main actuating cylinder 65 to move grinding wheel 35 into and out of play with saw blade 1. This automatic sequencing is accomplished by a programmer 121 which, in addition to automatically sequencing for the purpose of engaging subsequent cutting edges 13, must insure that the operation of the main actuating cylinder 65 does not interfere with the extension of indexer 91, causing a conflict with grinding wheel 35 and the indexing operation.

Figure 4:
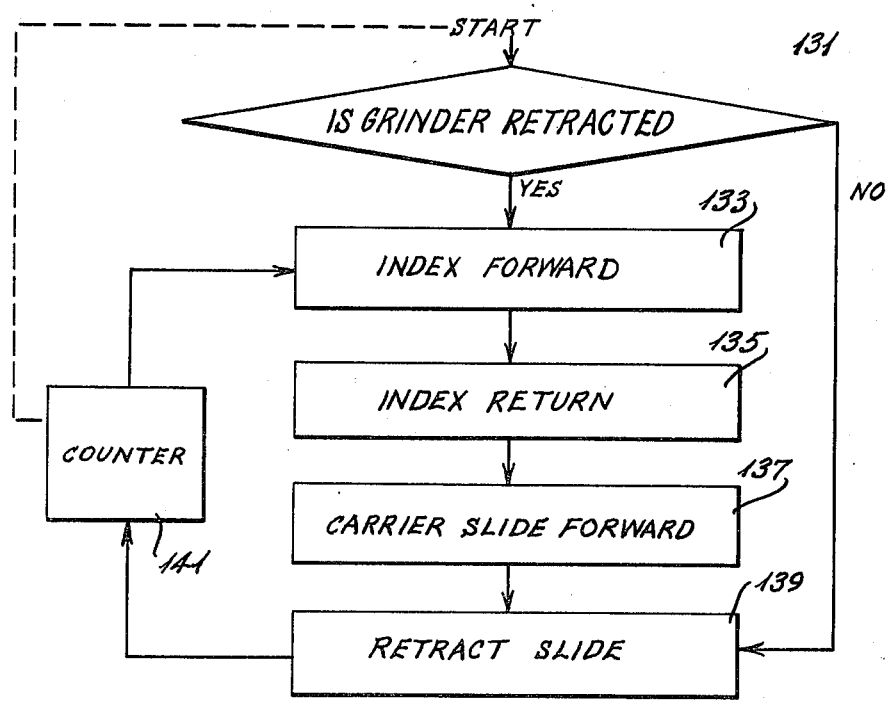
FIG. 4 is a block diagram of the steps performed by an apparatus in cutting saw blades according to the invention.

Referring to FIG. 4, when a start button is pushed, the programmer 121 first determines whether the carrier 63 is retracted by the main actuating cylinder 65, as indicated by the minimum limit switch 69. This step is represented by block 131. If the carrier has been retracted, engaging the minimum limit switch 69, a "YES" decision enables the automatic sequencing operation to proceed. In a step represented by block 133, the index actuating cylinder 93 is caused to index forward until it bottoms, or, alternatively, until the index position stop 101 engages the flange 99. As previously stated, this causes pawl 95 with pawl finger 103 to move to the cylinder bottom or the index position. After the index position has been reached, in a step indicated by lock 135, index actuating cylinder 93 is permitted to retract. This causes pawl 95 to retract away from the index position.

During the index forward step 133, it is desirable that only a light magnetic force be applied by the electromagnets 81, 83 to saw blade 1. In the preferred embodiment, this light magnetic force is accomplished by applying a voltage across the primary electromagnet 81 and switching off the secondary electromagnet 83, thereby reducing the value of the current flowing through the secondary electromagnet 83, thereby reducing the value of the current flowing through the secondary electromagnet 83 to zero. However, it is also possible to apply a voltage to both electromagnets 81, 83, no voltage across electromagnet 81, or any other combination. The purpose of the magnetic force during the index forward step 133 is to apply a drag force to the saw blade 1 to resist the free rotation of the saw blade 1 while the saw blade 1 is being indexed. The indexer 91 must, of course, be able to overcome the drag caused by the electromagnets 81, 83 during the index forward step 133. Therefore, the combined drag force of the electromagnets 81, 83 must be less than a maximum force which indexer 91 is capable of exerting on the saw blade.

After indexer 91 has indexed the saw blade, the grinding wheel is able to be extended by the main actuating cylinder 65. However, it is important that pawl 95 be retracted by index cylinder 93 by the time the grinding wheel 35 is in engagement with the saw blade. In order to insure that pawl 95 has been successfully retracted by the time the grinding wheel 35 reaches the saw blade, the main actuating cylinder 65 does not extend until after the index retract stop 105 has engaged the flange 99, indicating the completion of the index return step 135. After the index return step 135 has been completed, the main actuating cylinder 65 is extended, causing carrier 63 with motor 33 and grinding wheel 35 to move toward saw blade 1. This is accomplished in a carrier slide forward step, indicated by block 137. This forward movement of carrier 63 is continued until maximum limit switch 71 is engaged by carrier 63, thus completing the carrier slide forward step 137. After the carrier slide forward step 137 is completed, slide 63 is retracted by main actuating cylinder 65 in a retract slide step, indicated by block 139. The carrier 63 is retracted until the minimum limit switch 69 is engaged, thus completing the retract slide step 139.

The completion of the retract slide step 139 initiates a count in counter 141. The count is indicative of a completed cutting operation on one tooth. The counter is set with a selected count and is able to compare an accumulated number of counts resulting from the completion of the retract slide step 139 with the selected number of counts in a conventional manner. If the accumulated number of counts is less than the selected number, the index forward step 133 is repeated in order to repeat the indexing and grinding operations.

If, after the start button is pushed, the grinder 35 has not fully retracted, then, in the decision step 131, a "NO" determination is made and the retract slide step 139 is initiated. In the usual case, a "NO" determination results from the apparatus 57 having been adjusted with a saw blade and the apparatus 37 having been tested against a cutting edge 13. Therefore, one of the cutting edges will have already been faced when the start button is pushed. For this reason, counter 141 is caused to advance one count after the retract slide step 139 has been completed, representing that on a saw blade having X number of cutting edges, X-1 cutting edges remain to be ground. Advantageously, if several similar blades are to be faced using the same adjustment as for the first blade, then the selected count would remain the same. Each time the start button is pushed, the accumulated count in the counter 141 would be reset to a zero accumulation value.

It should be noted that when the grinding wheel 35 is engaging the saw blade, it is desired that the electromagnets 81, 83 exert enough drag force on the saw blade to prevent the saw blade from rotating during the grinding operation. Thus, during the carrier slide forward step 137, a full voltage is applied across both the primary electromagnet 81 and the secondary magnet 83. This full force is also applied during the retract slide step 139 because the grinding wheel 35, as the carrier 63 is being retracted by the main actuating cylinder 65, will still be rotating and therefore lightly dress the cutting edge 13 which has just been ground. Therefore, while the electromagnets 81, 83 can be used to create damping effect during the indexing operation, their primary function is to hold the saw blade 1 during engagement by the grinding wheel.

If a cutting edge 23 of a deep raker 19 is present on the saw blade, the cutting edge 23 would be able to pass over the electromagnets 81 and 83 or, if a deep raker 19 is over an electromagnet 81 or 83 during the carrier slide forward step 137, then the electromagnet 81 or 83 would still perform its clamping function. In order to prevent the deep rakers 19 with their cutting edges 23 from damaging the electromagnets 81, 93, the electromagnets 81, 83 are each provided with a hard exteriod surface, using a material such as tungsten carbide.

In the preferred embodiment, the main actuating cylinder 65 and the index cylinder 93 are hydraulic cylinders which are extended by hydraulic fluid pressure. This is advantageous because the hydraulic fluid pressure allows a more precise control of the cylinders 65, 93, particularly with respect to a response time and maximum extension of the cylinders 65, 93. Each of the cylinders 65, 93 are provided with separate extension and retract lines in a conventional manner. Thus, positive extension and retraction of the cylinders 65, 93 is achieved. Preferably, self centered, four way electrically activated hydraulic valves are used, in which two solenoid coils are used per valve; one coil for causing the cylinder to expand, and one coil activated to cause the cylinder to retract.

When the index actuating cylinder 93 has extended pawl 95 to the index position, the hydraulic pressure causing index actuating cylinder 93 to extend increases, thus activating an "index position achieved" pressure switch (PS1). This indicates the completion of the index forward step 133. An "indexer retracted" pressure switch (PS3) is provided to indicate the retraction of the index actuating cylinder 93, thus indicating the conclusion of the index return step 135.

The index actuating cylinder 93 being a conventional hydraulic cylinder, is provided with hydraulic fluid under pressure to extend and is provided with hydraulic fluid under pressure to retract with separate lines. The "index position achieved" and "indexer retracted" pressure switches are connected to these separate lines so as to indicate fluid pressures in extending and retracting the cylinder, respectively.

The pressure $P_{SW}$ that the pressure switches read therefore can be related to the force exerted on pawl 95 as follows:

$$P_{SW} = P_{HYD}$$

-continued $$= \frac{F_{PAWL}}{A_{CYL} - A_{ROD}}$$

where:
- $P_{SW}$ = Pressure applied to pressure switch;
- $P_{HYD}$ = Hydraulic pressure
- $F_{PAWL}$ = Force of extension or retraction exerted by pawl 95 and stop 101 or 105, or by bottoming of forward stroke.
- $A_{CYL}$ = Internal cross-sectional area of index actuating cylinder 93.
- $A_{ROD}$ = Cross-sectional area of cylinder rod 107 on the pressurized side of the cylinder 93.

In conventional hydraulic cylinders, the rod would not be located on the side of the cylinder pressurized for extension, making $A_{ROD}=0$ for extension. Thus, the pressure for extending the pawl 95 would be:

$$P_{HYD} = F_{PAWL}/A_{CYL}$$

The "index position achieved" switch would be set according to maximum force on the pawl 95 $F_{PAWL}$ which the indexer 93 must overcome. Thus, when the index cylinder reaches bottom, the "index position achieved" pressure switch will be activated. The operation of the "indexer retracted" pressure switch is determined in a similar manner.

Main actuating cylinder 65 is also a conventional hydraulic actuating cylinder. However, because the pressure used for moving the carrier 63 cannot easily be designed to a specific limit, the aforementioned minimum and maximum limit switches 69, 71 are provided to indicate the completion of the retract slide and carrier slide forward steps 139, 137, respectively. Thus, it is not necessary to provide stops analogous to stops 105 to control the movement of the carrier 63. This is advantageous because the movement of the carrier 63, particularly the forward movement, can be made to continue, even if that movement is at a slow rate because of the grinding operation of the grinding wheel on the saw blade. A backup safety system may be provided, including a pressure switch PS2, for indicating full advancement of the grinder to an adjustable stop at the bottom of the cylinder 65.

Because the activation of the pressure switches and limit switches 69, 71 indicates the completion of steps 133, 135, 139, and 137, respectively, the activation of minimun limit switch 69 also provides a "YES" indication for step 131. The full sequence of operation necessary to automatically face a plurality of saw teeth can thus be achieved by selective activation of hydraulic pressure in a manner known to those skilled in the art.

Figure 6:
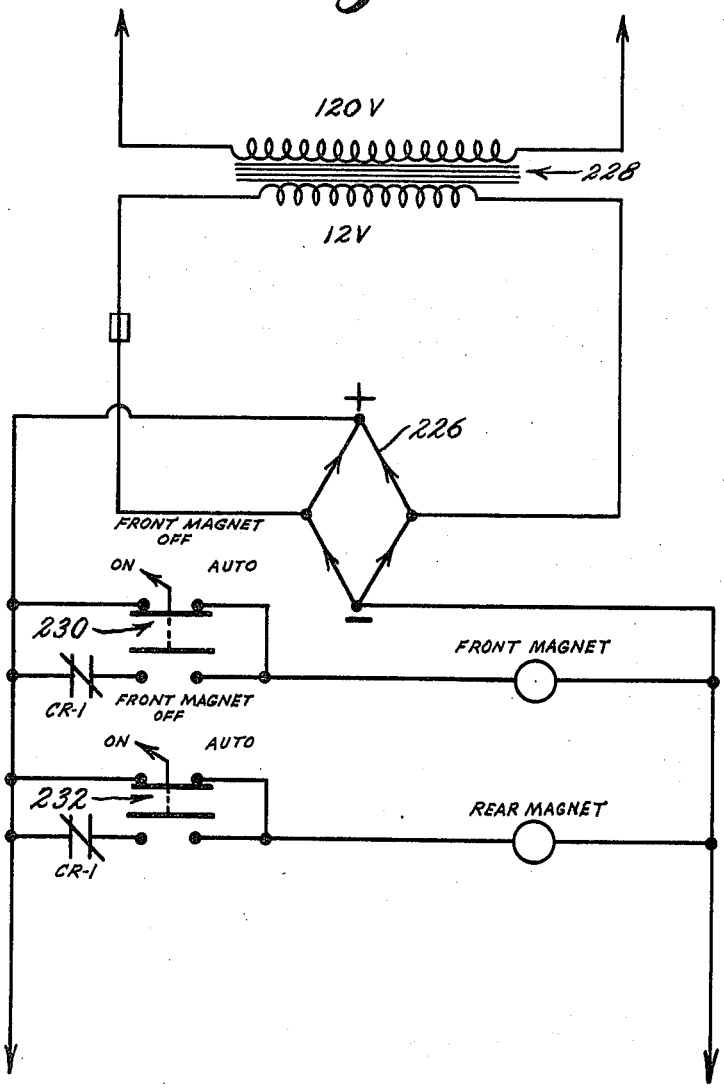
FIG. 6 is a wiring diagram of the electromagnets of the present invention.

The sequence programmer 121 is shown in greater detail in FIGS. 5 and 6. As seen in FIG. 5, hydraulic solenoid coils 202, 204, 206 and 208, which control activation of 93, the index cylinder, in and out, and of the main activating cylinder 65 in and out, respectively, are controlled by the conditions of various switches and relay contacts, and by limit and pressure switches. Specifically, control relays CR1, CR2, CR3 and CR4 have associated normally open and normally closed contacts, labelled as are the controlling relays therefor. The control relays themselves are activated by conditions of the pressure and limit sensors, and by the conditions of several contacts associated with control relays. Finally, limit switches LS1 and LS2, previously referred to by reference numerals 69 and 71, respectively, and pressure switches PS1, PS2, and PS3 are used to provide feedback information to the control relays concerning the condition of the hydraulic cylinders. A master relay MR, control button CB and manual/automatic switch 210 are used to supply power to the circuit, and the sequencing is controlled as follows.

Upon selection of the manual or automatic mode of operation, it is seen that switch 210 provides power to line $V_M$ or to $V_A$, respectively, once the control button CB and master relay MR are activated. Assuming the automatic mode, power is supplied to line $V_A$ when the cycle-start switch is in the closed (start) position. Inasmuch as all relays are unenergized, only the normally closed (NC) contacts are closed. Thus, only CR1 may be activated, if limit switch LS1 is closed. Further, hydraulic valve control coil 208, activating the "grinder out" phase, is activated. As a result, if LS1, which is a normally open (NO) switch closed when the grinder is fully retracted, is closed, CR1 will be activated. If CR1 is not so activated, or energized, then the NC contact in the circuit of coil 208 will be closed, assuring the performance of a "grinder out" sequence until LS1 is closed. That is, steps 131 and 139 of FIG. 4 are performed. The remaining switches are preferably of the following types:
- LS2: NC, opens upon full advancement of grinder
- PS1: NO, closes upon bottoming of indexing cylinder
- PS2: NC, opened by full advancement of grinder
- PS3: NO, closed upon return of indexing cylinder.

From the schematic wiring diagram, it is seen that the following Boolean expressions describe the operation of the circuit (in which products represent logical AND functions and sums represent logical OR functions, primes representing complements):

CR1 = CR2' LS1 $V_A$
CR2 = (PS1 + PS2 LS2 CR2) $V_A$
CR3 = CR2 (CR3 + CR4' PS3) $V_A$ + PS3 (Index Out) $V_M$
CR4 = $V_M$, where (Index Out) represents the position of switch 212 as in the Index Out position. Additionally, the hydraulic solenoid coils are seen to be governed by the following equations:

Coil 202 [Index In] = LS1[CR1CR4'$V_A$ + CR4(Index In)$V_M$]

Coil 204 [Index Out] = CR3'[CR4'PS1$V_A$ + CR4(Index Out)$V_M$]

Coil 206 [Grinder In] = CR2CR3CR4'$V_A$ + CR4(Grinder In)$V_M$

Coil 208 [Grinder Out] = CR1'CR2'[CR3'$V_A$ + CR4(Grinder Out)$V_M$].

Thus, continuing with the illustration, when CR1 is energized, the [Index In] coil 202 will be energized, starting the movement of indexing cylinder 93 inwardly, until it closes PS1. At that time, CR2 is energized, de-energizing CR1, and causing the [Index Out]-coil 204 to be activated. A similar consideration shows operation of the programmer throughout the entire program as previously described, with the availability of a manual mode of operation in which switch 210 provides power to line $V_M$ rather than $V_A$, and in which individual operations are provided by the positioning of multi-position switches 212 and 214.

FIG. 5 additionally illustrates provision of a switch 216 for energizing a coolant pump motor, and switches in the starting circuits of the hydraulic motors, along with thermally sensitive safety devices 222, 224.

As shown in FIG. 6, the two magnets are energized by a full wave rectifier 226, receiving a 12 volt output of a stepdown transformer 228. The magnets are controlled by three way switches 230, 232, shown in the ON positions. In the automatic positions, the bottom contacts of the switches are made, and the magnets are energized only when control relay CR1 is deenergized. The input to step down transformer 228 is taken directly across master relay MR, shown in FIG. 5.

As is apparent to those silled in the art, the present programmer, which utilizes relays and relay contacts, may be replaced by logic devices, utilizing logic gates, for example. Alternatively, a microprocessor may be used, programmed to respond to activation of specific limit and pressure switches by activation of specific control signals for electrical motors, or for hydraulic motors, as provided in the preferred embodiment.

In order to further facilitate this grinding operation, lubricants may be applied to the grinding wheel 35 by lubricator hose 145. Referring to FIGS. 2–3, lubricant squirted by the lubricator hose 145 onto the grinding wheel 35 results in a more efficient grinding operation with less wear to the grinding wheel 35. The lubricant also tends to wash away particles of material ground from the saw blade which would otherwise accumulate and gouge the surfaces of the cutting teeth 13. A drain board 147 is attached to the chassis portion 59 underneath the blade mounting apparatus 37 in order to receive the lubricant squirted by hose 145. A drain 149 is provided on drain board 147 to permit lubricant to drain back to a recycling tank (not shown) where the spent lubricant is filtered and pumped into lubricator hose 145. The drain board 147 and drain 149 also permit the exterior surface of the apparatus to be cleaned with the lubricant and cleaned when fresh lubricant is being added. While the lubricant may be pumped continuously, it is preferable only to pump lubricant during the carrier slide forward and retract slide steps 137, 139.

While the invention has been described in terms of the preferred embodiment thereof, it is anticipated that various changes can be made without departing from the inventive concepts therein. For example, a micrometer-type shaft adjustment 151 may be provided to adjust the axial position of the grinding wheel 35 with respect to the motor 33. This results in a fine adjustment of the grinding wheel 35 with respect to the index position.

It is anticipated that electromagnets 81, 83 may be permitted to vertically reciprocate in their housings so that the electromagnets may move in an upward direction toward a saw blade when they are turned on. While the attraction of the magnets toward the saw blade would be sufficient to cause the magnets to engage the blade when turned on, it is possible to mechanically bias the magnets to the extended position.

It is also possible, with appropriate guides used instead of the center shaft 43, to adapt the apparatus to face linear saw blades such as band saw blades.

Accordingly, the foregoing description should not be construed as limiting the scope of this invention.

I claim:

1. An automatic sawfacing machine for facing saw blades of the type having a generally disc-shaped profile with a plurality of teeth spaced about the perimeter of the profile and a center hole at the center thereof, the facing being accomplished by performing grinding operations at individual teeth of said plurality of spaced teeth, the machine comprising:
    (a) a center spindle;
    (b) blade gripping means comprising at least one electromagnet, the blade gripping means holding the blade at the center spindle;
    (c) reciprocally movable saw blade cutting means for reciprocating into and out of a position for engaging and facing the saw blade;
    (d) saw blade index means comprising a pawl and a pawl actuator, the pawl actuator operable to cause the pawl to extend toward and into engagement with a first tooth on the saw blade to rotate the saw blade about the center springle until said first tooth is in an index position and to retract the pawl to a point beyond a subsequent tooth, the subsequent tooth being located forward of the first tooth;
    (e) programmed sequencing means for first reducing the force exerted by said at least one electromagnet and then for causing the pawl actuator to extend the pawl toward the index position and then increasing the force exerted by said at least one electromagnet after said pawl has rotated a saw blade tooth to an indexed position and for then causing the saw blade cutting means to reciprocate into said position for engaging and facing the saw blade after the pawl actuator has positioned the pawl at the index position and for then retracting the saw blade cutting means, thereby completing a cycle of operation;
    (f) counting means for counting a number of said cycles, one count at the end of each cycle and the counting means having a selectable maximum count, wherein after the selectable maximum count has been reached, the sequencing means is prevented from operating.

2. The apparatus of claim 1 wherein said programmed sequencing means comprises means for causing the pawl actuator to retract the pawl away from the index position after having first extended the pawl toward the index position.

3. The apparatus of claim 1 wherein said programmed sequencing means comprises a sequential circuit including plural sensors, control relays, and contacts operated by said control relays, for activating said pawl actuator and a reciprocating means for reciprocating said reciprocally movable saw blade cutting means,
    said sendors providing signals to said control relays, said contacts providing signals to said control relays and to said pawl actuator and said reciprocating means.

4. The apparatus of claim 3 wherein said pawl actuator and said reciprocating means each include hydraulic means having solenoid control valves responsive to said sensor signals and to said contact signals.

5. The apparatus of claim 1 wherein a blade position adjustment means provides a coarse adjustment for the distance between said center of the blade and the saw blade cutting means when the saw blade cutting means is in said position for engaging the saw blade and fine adjustment means is provided for adjusting the position of the saw blade cutting means when the saw blade cutting means is in the position for engaging the saw blade.

6. The apparatus of claim 1 wherein the saw blade cutting means is a grinding wheel driven by a motor.

7. The apparatus of claim 1 wherein the center spindle comprises a hub ring and a cone-shaped element positionable along a center shaft within the hub ring coinciding with the intended axis of rotation of the saw blade, the cone movable downwardly against the hub ring for engaging the center hole of the saw blade in order to position the saw blade on the apparatus while the blade gripping means is gripping the blade and while the index means is indexing the blade, thereby permitting the blade to be retained in position, regardless of irregularities in the profile of the blade outside of the center hole.

8. The apparatus of claim 1 wherein a pawl return adjustment means is provided to control the minimum extension of the pawl, the minimum extension occurring when the pawl is in its retracted position.

9. The apparatus of claim 1 wherein said programmed sequencing means comprises:
 (a) means for assuring that the saw blade cutting means is reciprocated out of said position for engaging the saw blade prior to extending the pawl towards said index position;
 (b) means for extending the pawl to the index position only when said saw blade cutting means is out of said position for engaging said saw blade;
 (c) means for retracting the pawl after the pawl has been extended to the index position; and
 (d) means for reciprocating the saw blade cutting means into said position for engaging the saw blade only after the pawl has indexed said saw blade.

10. The apparatus of claim 1 wherein the pawl actuator is pivoted to permit the extended pawl to swing about a pivot axis in a segment of an arc which passes through the index position, wherein the pawl actuator is spring biased so as to pivot toward the center spindle, and the pawl and pawl actuator are limited in said pivotal movement by abutting against the subsequent teeth of the saw blade.

11. The apparatus of claim 1 wherein a lubrication system provides lubricating fluid to the tooth being cut.

12. The apparatus of claim 11 wherein the lubrication system further comprises a return tray and a tank, thereby permitting the recycling of lubricating fluid.

13. The apparatus of claim 1 wherein the blade gripping means comprises at least two electromagnets, the first of said electromagnets being located adjacent the index position and the second of said electromagnets being located, with respect to the center spindle, between 90° and 180° from the first of said electromagnets.

14. The apparatus of claim 13 wherein one of said first and second electromagnets is provided with a current which is at a first value when the saw blade cutting means is reciprocating into said position to engage the saw blade and is at a second value when the pawl actuator is extending, the second value being less than the first value.

15. The apparatus of claim 1 wherein the pawl actuator is an hydraulic cylinder, including a pressure sensitive switch responsive to an increased fluid system pressure resulting from extension of the pawl to its limit, the pressure switch providing a signal for causing the sequencing means to retract the pawl actuator.

16. The apparatus of claim 15 wherein the pawl actuator comprises a stroke adjustment means for limiting the distance travelled by said pawl, said stroke adjustment means including an adjustable stop, the adjustable stop preventing the pawl actuator from extending the pawl beyond the index position.

17. In an automatic sawfacing machine for facing sawblades of the type having a generally disc-shaped profile with a plurality of teeth spaced about the perimeter of the profile and including reciprocally movable sawtooth grinding means and sawblade indexing means for indexing a tooth of said sawblade to a grinding position, the improvement comprising a programmed sequencing means including:
 (a) first means for providing a first signal indicative of whether or not said grinding means is retracted from said grinding position;
 (b) second means responsive to said first signal indication of retraction of said grinding means for causing said indexing means to index a next tooth for grinding at said grinding position and for generating a second signal indicative of such indexing;
 (c) third means responsive to said second signal indication of an indexing step for causing said grinding means to move towards said grinding position and for providing a third signal indicative of reaching said grinding position and conclusion of a grinding step;
 (d) fourth means responsive to said third signal for retracting said grinding means and for providing a fourth signal indicative thereof; and
 (e) said indexing means including fifth means applying an electromagnetic retaining force on said saw blade to retain said saw blade in a fixed position, said retaining force being controllable by said programmed sequencing means whereby said retaining force is reduced before each said next tooth is indexed, and said retaining force is increased after each said next tooth is indexed and before said movement of said grinding means toward said grind-position.

18. The apparatus of claim 17 wherein said indexing means comprises means for indexing teeth to the grinding position irrespective of uneven spacing between the sawblade teeth.

19. The apparatus of claim 17 further comprising sixth means responsive to said second signal for retracting said indexing means and for generating a fifth signal indicative of such retraction, wherein said third means more specifically responds to said fifth signal for moving said grinding means towards said grinding position.

20. The apparatus of claim 19 further comprising means for manually sequencing said first, second third, fourth, fifth and sixth means of said programmed sequencing means.

21. An automatic sawfacing machine for facing sawblades of the type having a generally disc-shaped profile with a plurality of teeth spaced about the perimeter of the profile and a symmetrical hole at the center thereof, the facing being accomplished by performing grinding operations at individual teeth of said plurality of spaced teeth, the machine comprising:
 (a) a blade gripping means;
 (b) a sawblade index means;
 (c) a center spindle comprised of a cone-shaped element traveling along an axis coinciding with the intended axis of rotation of the sawblade, the cone engaging the center hole of the sawblade in order to position the sawblade on the apparatus while the blade gripping means is gripping the blade and while the index means is indexing the blade, thereby permitting the blade to be retained in position, regardless of irregularities in the profile of the blade;

(d) the blade gripping means comprising at least one electromagnet, the blade gripping means holding the blade at the center spindle;

(e) a grinding wheel driven by a motor which is in turn mounted on a carrier, the carrier being reciprocally movable, thereby enabling the sawblade cutting means to engage the sawblade;

(f) a main hydraulic actuating cylinder operable to extend the carrier forward to place the cutting means in engagement with the sawblade;

(g) the sawblade index means comprising a pawl and a pawl actuator, the pawl actuator operable to cause the pawl to extend toward and into engagement with a first tooth on the sawblade, rotate the sawblade about the center spindle until said first tooth is in an index position and then retract to a point beyond a subsequent tooth, the subsequent tooth being located forward of the first tooth, and the pawl actuator being pivoted to permit the extended pawl to swing about a pivot axis in a segment of an arc which passes through the index position, and wherein the pawl actuator is spring biased so as to pivot toward the center spindle, the pawl and pawl actuator being limited in said pivotal movement by the abutting against the successive teeth of the sawblade;

(h) a stroke adjustment means comprising a pawl return adjustment controlling the minimum extension of the pawl actuator, the minimum extension occurring when the pawl actuator is in its retracted position;

(i) forward limit means controlling the maximum forward extension of the main hydraulic cylinder;

(j) a sequencing means, the sequencing means first reducing the force exerted by said at least one electromagnet and then causing the pawl actuator to extend the pawl toward the index position and then causing the pawl actuator to retract the pawl away from the index position and then increasing the force exerted by said at least one electromagnet, the sequencing means further causing the main hydraulic actuating cylinder to extend the carrier forward after the pawl actuator has positioned the pawl at the index position and then causing the main hydraulic actuating cylinder to retract the carrier; and (k) a counting means advancing one count at the end of each cycle of said sequencing means and having a selectable maximum count, wherein after the selectable maximum count has been reached, the sequencing means is prevented from operating.

22. A method for grinding saw blades of the rotary type, the method comprising the steps of:

(a) placing the saw blade on a center spindle;

(b) indexing the saw blade by extending an indexing means against a saw tooth to an index position;

(c) retracting the index means;

(d) gripping the saw blade by electromagnetic force after the saw blade has been indexed, said electromagnetic force being reduced before said indexing step and being increased after said indexing step;

(e) reciprocating a grinding wheel toward the index position, thereby allowing the grinding wheel to face grind the saw blade;

(f) retracting the grinding wheel away from the index position;

(g) repeating steps b-f a predetermined number of times.

23. The method of claim 22 wherein the index means is extended and retracted by an hydraulically operated piston and cylinder arrangement.

24. The method of claim 23 wherein the extenson and retraction of the hydraulic piston and cylinder arrangement is controlled by steps blocking extension and retraction beyond predetermined points, the blocked extension causing hydraulic pressure to increase and activate an hydraulic pressure switch thereby causing the hydraulic cylinder to be retracted.

25. The method of claim 23 further comprising the step of providing lubrication to assist in the face grinding of the saw blade.

* * * * *